(12) United States Patent
Asakura

(10) Patent No.: US 6,650,595 B2
(45) Date of Patent: Nov. 18, 2003

(54) FLASHER TYPE FISH SONAR

(75) Inventor: Yoshiyuki Asakura, Aichi-ken (JP)

(73) Assignee: Honda Electronics Co., Ltd., Aichi-Ken (JP)

(*) Notice: Subject to any disclaimer, the term of this patent is extended or adjusted under 35 U.S.C. 154(b) by 0 days.

(21) Appl. No.: 10/154,522

(22) Filed: May 24, 2002

(65) Prior Publication Data
US 2002/0186617 A1 Dec. 12, 2002

(30) Foreign Application Priority Data
Jun. 6, 2001 (JP) .................................. 2001-170941

(51) Int. Cl.⁷ .............................................. G01S 15/96
(52) U.S. Cl. ...................................................... 367/109
(58) Field of Search .................................. 367/109, 112

(56) References Cited

U.S. PATENT DOCUMENTS 3,964,012 A  6/1976 Yamamoto et al.
4,184,142 A * 1/1980 Burch et al. ................ 367/109
5,065,371 A  11/1991 Leavell et al.
5,973,997 A  10/1999 Yamamoto et al.

FOREIGN PATENT DOCUMENTS

JP    2001221850 A  *  8/2001  ........... G01S/15/96

OTHER PUBLICATIONS

Vexilar FL–18 Owner's Manual, pp. 1–30, Date unknown.*

* cited by examiner

Primary Examiner—Daniel T. Pihulic
(74) Attorney, Agent, or Firm—Richard M. Goldberg

(57) ABSTRACT

A flasher type fish sonar includes an ultrasonic vibrator transmitting and receiving ultrasonic waves in water, a transmitting circuit supplying oscillating signals to the ultrasonic vibrator, a receiving circuit amplifying reflected signals received by the ultrasonic vibrator, an A/D converter converting the reflected signals to digital signals, an input circuit receiving the digital signals from the A/D converter through a control circuit, a flasher display including a rotary disk having a rotated luminous body and a display board having a window displaying luminosity of the luminous body in response to the digital signals from the input circuit through brushes and slip rings, and a constant current circuit in the input circuit which eliminates changes of electric current flowing to the luminous body due to contact resistance between the slip rings and the brushes.

5 Claims, 7 Drawing Sheets

FLASHER TYPE FISH SONAR

BACKGROUND OF THE INVENTION

The present invention relates to a flasher type fish sonar in which a circular board having a luminous body is rotated in a window of a display board.

In a prior flasher type fish sonar, a circular window is formed in the periphery of a display board provided with the front of a case, a luminous body mounted on a rotary disk is arranged opposite to the window, and the rotary disk is rotated by a motor. Brushes 8 are attached to slip rings provided with the rotary shaft of the rotary disk, an input circuit is connected to the brushes and a flasher display is constituted by these elements. A transmitting-receiving circuit is connected to the input circuit. When a signal from the transmitting-receiving circuit is input from the input circuit to the luminous body through the brushes and the slip rings, a part A becomes a starting point showing the surface of the sea, fishes are shown by parts B and C and the bottom of the sea is shown by a part D.

In the transmitting-receiving circuit, when output signals are input from a control circuit to a transmitting circuit, oscillating signals are input from the transmitting circuit to an ultrasonic transducer, and ultrasonic signals are emitted to the sea. When reflected signals from the sea are received by the ultrasonic transducer, the reflected signals are amplified by a receiving circuit, the amplified reflected signals are converted to digital signals in an analogue to digital converter, and the digital signals are input from the control circuit to a base of a transistor through a resistor of the input circuit of the flasher display. The base of the transistor is connected to the ground through a resistor. An emitter of the transistor is connected to the ground, a collector of the transistor is connected to the anode of the luminous body through a resistor, one of the brushes and the slip rings, and the cathode of the luminous body is connected to a direct current electric power source through the slip rings and the other of the brushes.

In the flasher type fish sonar, because the direct current electric power connected to the luminous body in the flasher display is constituted by a constant voltage circuit, when the digital signals from the control circuit are input to the base of the transistor of the input circuit of the flasher display, the electric current from the direct current electric power source flows to the luminous body through the other of the brushes and the slip rings and flows from the luminous body to the ground connected to the emitter from the collector of the transistor through the slip rings and the one of the brushes. Thus the electric current flowing to the luminous body is changed and the luminosity of the luminous body is changed when the contact resistance between the slip rings and the brushes is changed. When the change in the luminosity of the luminous body becomes high, a detection of fish is incorrectly viewed as the bottom of the sea.

SUMMARY OF THE INVENTION

It is, therefore, the primary object of the present invention to provide a flasher type fish sonar in which a constant current is input to a luminous body for eliminating a change of contact resistance between slip rings and brushes.

It is another object of the present invention to provide a flasher type fish sonar in which a constant current is connected to a luminous body for inputting constant current always.

In order to accomplish the above and other objects, the present invention comprises an ultrasonic vibrator for transmitting ultrasonic waves in the water and for receiving reflected signals in the water, a transmitting circuit for supplying oscillating signals to the ultrasonic vibrator, a receiving circuit for amplifying reflected signals received by the ultrasonic vibrator, an analogue to digital converter for converting the reflected signals to digital signals, an input circuit for inputting the digital signals from the analogue to digital converter by the control circuit, a flasher display consisting of a rotary disk having a luminous body mounted on a rotary disk rotating by a motor and a display board having a window displaying luminosity of the luminous body by inputting the digital signals from the input circuit through brushes connected to the input circuit and slip rings mounted on a rotary shaft of the rotary disk, the slip rings contacting the brushes, and a constant current circuit constituted in the input circuit, whereby changes of electric current flowing to the luminous body due to the contact resistance between the slip rings and the brushes is eliminated by the constant electric current from the constant current circuit.

DESCRIPTION OF THE PREFERRED EMBODIMENTS

Figure 1:
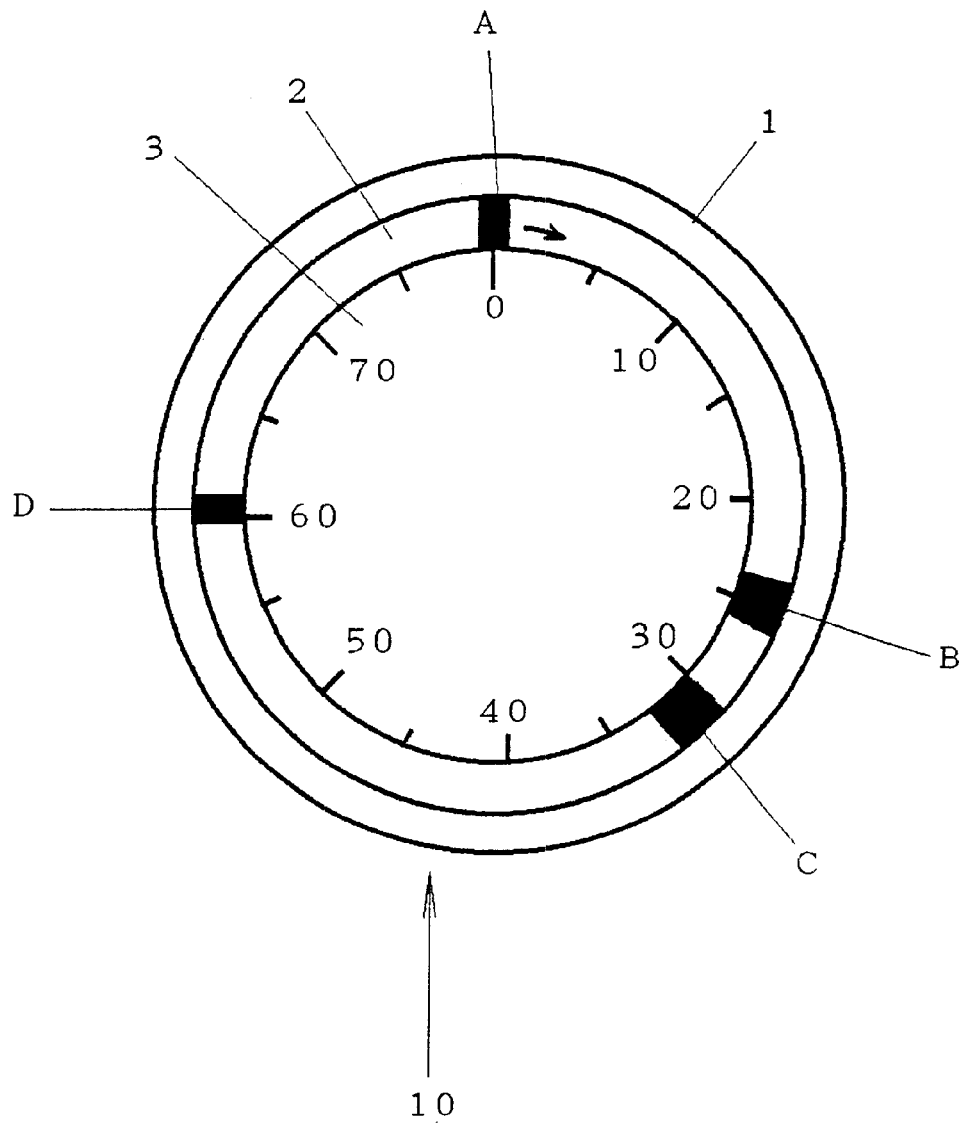
FIG. 1 shows a front view of the flasher display of a flasher type fish sonar in the prior art.
Figure 2:
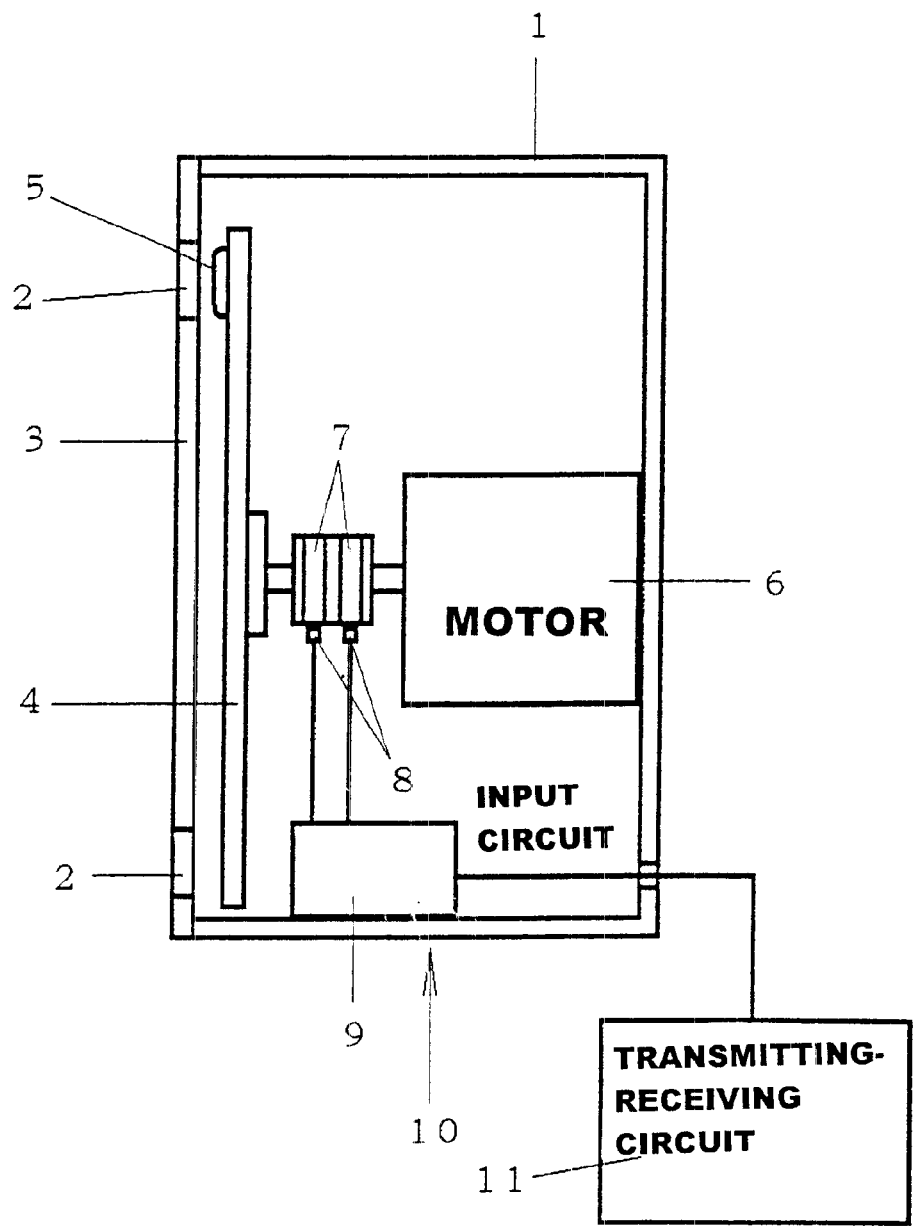
FIG. 2 shows a side sectional view of a flasher display in FIG. 1.

In a prior flasher type fish sonar, as shown in FIGS. 1 and 2, a circular window 2 is formed in the periphery of a display board 3 provided with the front of a case 1, a luminous body 5 mounted on a rotary disk 4 is arranged opposite to the window 2, and the rotary disk 4 is constituted to be rotated by a motor 6. Brushes 8 are attached to slip rings 7 attached to the rotary shaft of the rotary disk 4, and an input circuit 9 is connected to the brushes 8. A flasher display 10 is constituted by these elements. A transmitting-receiving circuit 11 is connected to the input circuit 9. When a signal from the transmitting-receiving circuit 11 is input from the input circuit 9 to the luminous body 5 through the brushes 8 and the slip rings 7, a part A becomes a starting point showing the surface of the sea, fishes are shown by parts B and C and the bottom of the sea is shown by a part D.

Figure 3:
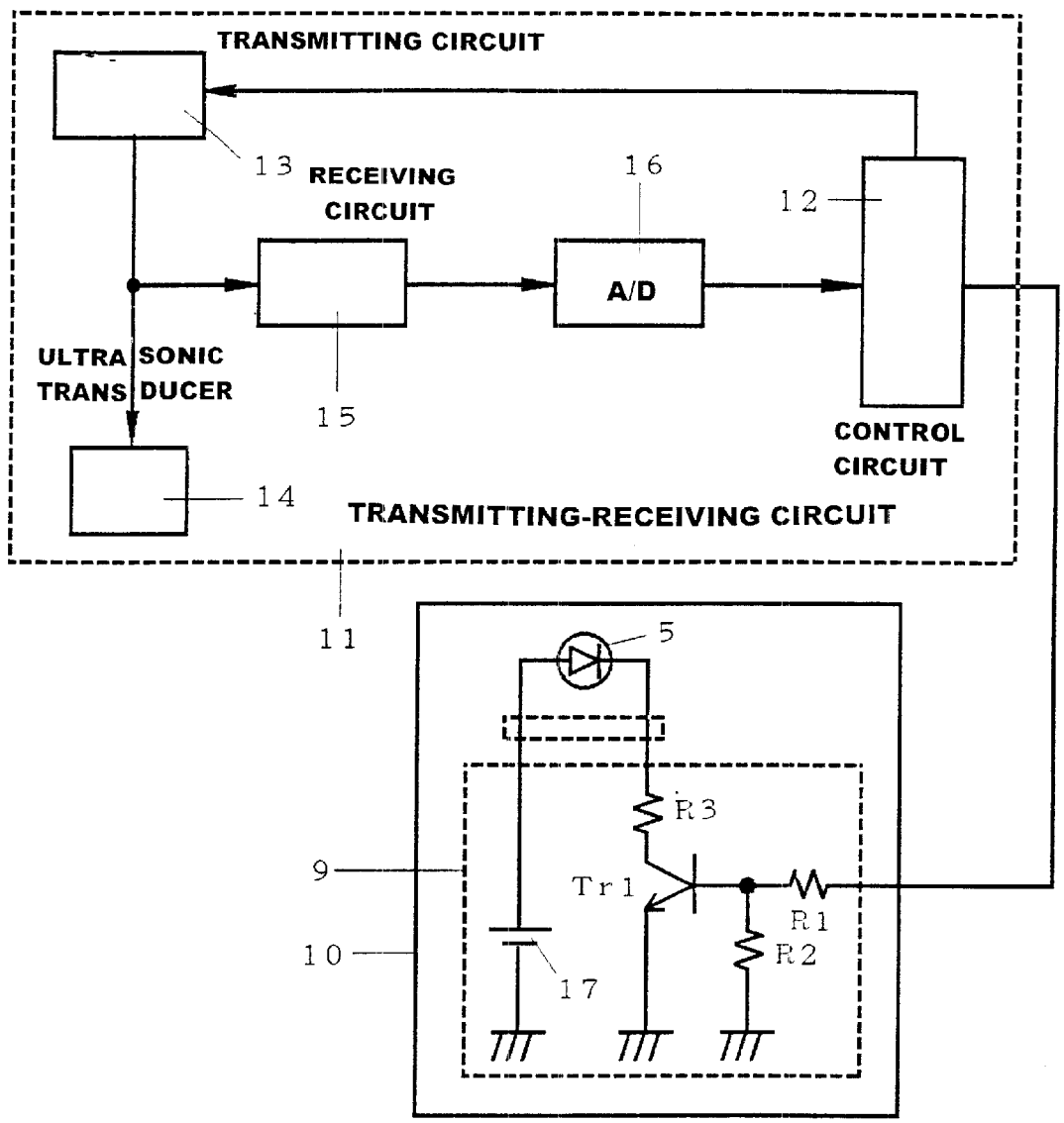
FIG. 3 shows a block diagram of the flasher type fish sonar in FIG. 1.

As shown in FIG. 3, in the transmitting-receiving circuit 11, when output signals are input from a control circuit 12 to a transmitting circuit 13, oscillating signals are input from the transmitting circuit 13 to an ultrasonic transducer 14, and ultrasonic signals are emitted to the sea. When reflected signals from the sea are received by the ultrasonic transducer 14, the reflected signals are amplified by a receiving circuit 15, the amplified reflected signals are converted to digital signals in an analogue to digital converter 16, and the digital signals are input from the control circuit 12 to a base of a transistor Tr1 through a resistor R1 of the input circuit 9 of the flasher display 10. The base of the transistor Tr1 is connected to the ground through a resistor R2, an emitter of the transistor Tr1 is connected to the ground, a collector of the transistor Tr1 is connected to the anode of the luminous body 5 through a resistor R3, one of the brushes 8 and the slip-rings 7, and the cathode of the luminous body 5 is connected to a direct current electric power source 17 through the slip-rings 7 and the other of the brushes 8.

In the flasher type fish sonar, because the direct current electric power 17 connected to the luminous body 5 in the flasher display 10 is constituted by a constant voltage circuit, when the digital signals from the control circuit 12 are input to the base of the transistor Tr1 of the input circuit 9 of the flasher display 10, the electric current from the direct current electric power source 17 flows to the luminous body 5 through the other of the brushes 8 and the slip-rings 7 and flows from the luminous body 5 to the ground connected to the emitter from the collector of the transistor Tr1 through the slip-rings 7 and the one of the brushes 8. Thus the electric current flowing to the luminous body 5 is changed and the luminosity of the luminous body 5 is changed when the contact resistance between the slip-rings 7 and the brushes 8 is changed. When the change in the luminosity of the luminous body 5 becomes high, a detection of fish is incorrectly viewed as the bottom of the sea.

Figure 4:
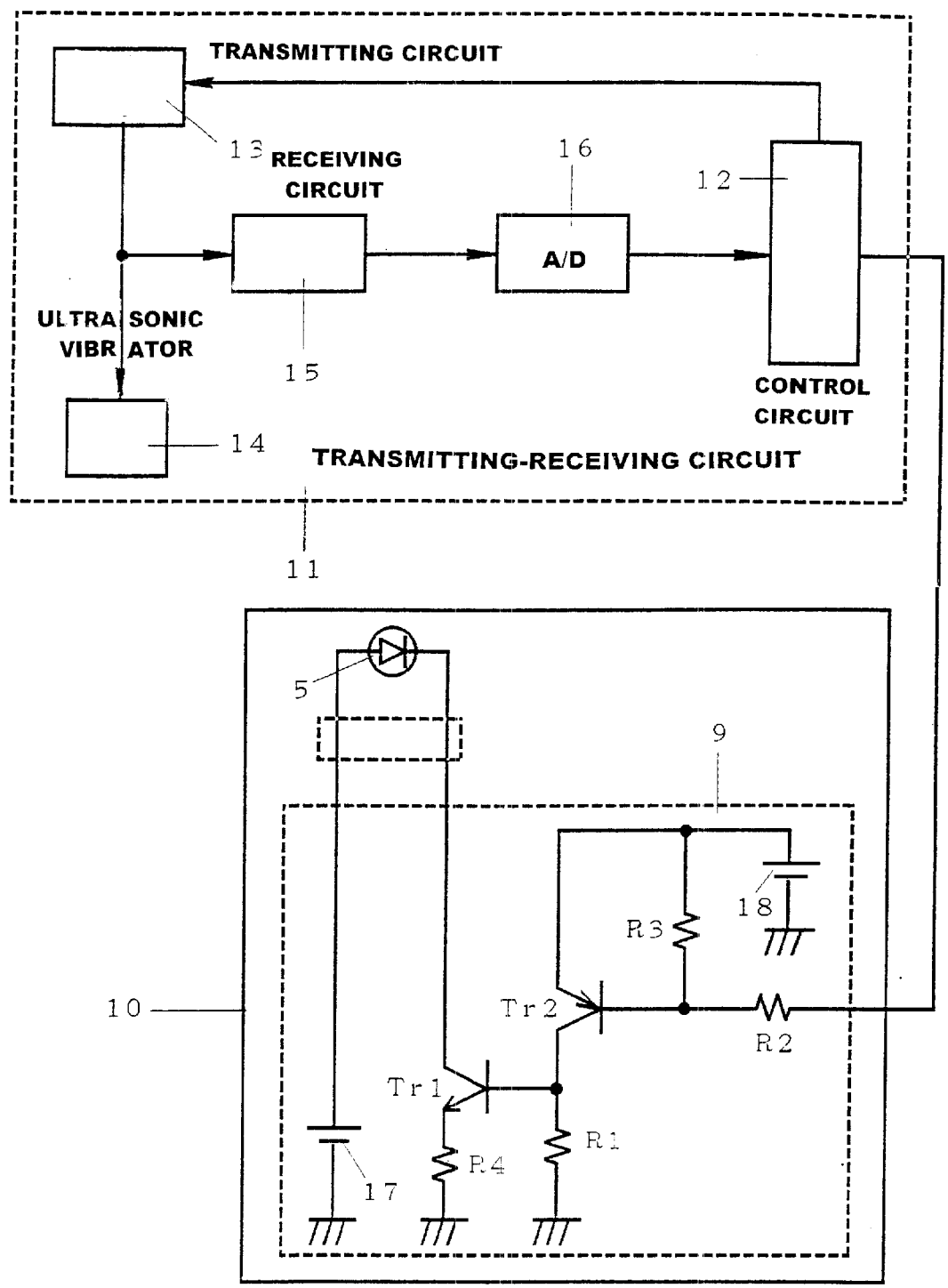
FIG. 4 shows a block diagram of the flasher type fish sonar of an embodiment in the present invention.

In FIG. 4, 5 designates a luminous body, 11 a transmitting-receiving circuit, 12 a control circuit, 13 a transmitting circuit, 14 an ultrasonic vibrator, 15 a receiving circuit, 16 an analogue to digital convertor, 17 a first direct current electric power source, R1 a first resistor, R2 a second resistor, and Tr1 a first transistor, and these constitutions are the same as those in the prior art and the explanation of these constitutions is omitted. In the embodiment, a resistor R4 is connected between the emitter of the first transistor Tr1 and the ground, a collector of a second transistor Tr2 is connected to the base of the first transistor Tr1 and the first resister R1, the base of the second transistor Tr2 is connected through the second resistor R2 to the output terminal of control circuit 12 in the transmitting-receiving circuit 11, the emitter of the second transistor Tr2 is connected to the plus terminal of a second direct current electric power source 18, the minus terminal of the second direct current electric power source 18 is connected to the ground, a third resistor R3 is connected between the emitter and base of the second transistor Tr2, and a constant current circuit is constituted by these constitutions.

In the flasher type fish sonar in the embodiment of the invention, when the reverse signals of the digital signals are input from the control circuit 12 of the transmitting-receiving circuit 11 to the base of the second transistor Tr2 and the electric current flows into the second transistor Tr2, the constant voltage subtracted by the putting-on voltage between the emitter-collector of the second transistor Tr2 from the voltage of the direct current electric power source 18 is generated at the first resistor R1 connected to the base of the first transistor Tr1, and thus the constant voltage is so generated at the fourth resistor R4 connected to the emitter of the first transistor Tr1 such that a constant current from the first direct current electric power source 17 flows between the collector and the emitter of the first transistor Tr1. Thus, the constant current flows to the luminous body 5, and the change of the electric current due to the change of the contact resistance between the slip rings 7 and the brushes 8 is eliminated. Then, even if the contact resistance is changed, the constant current always flows to the luminous body 5, and the luminosity of the luminous body 5 is not changed.

Figure 5:
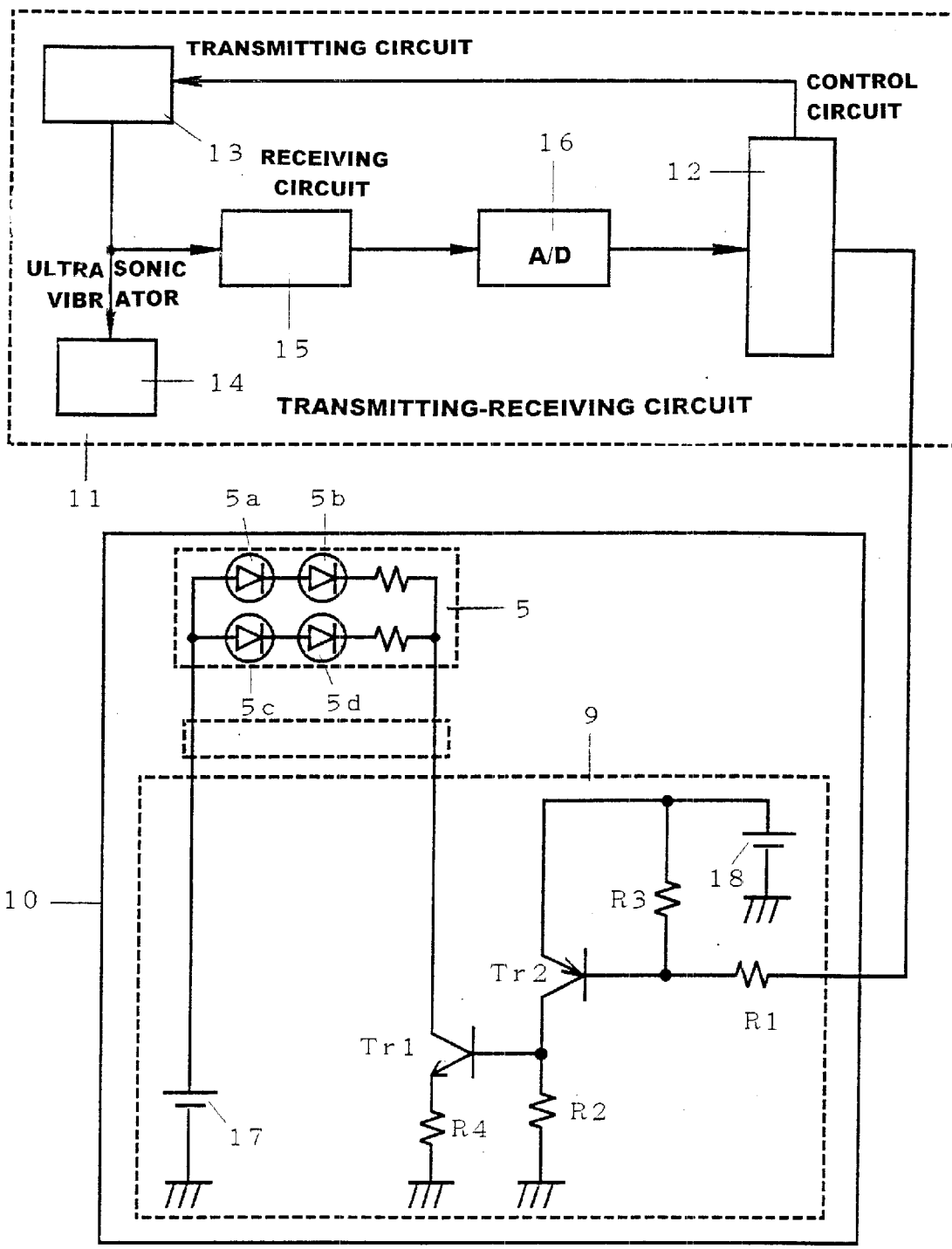
FIG. 5 shows a block diagram of the flasher type fish sonar of another embodiment in the present invention.

FIG. 5 shows another embodiment of the flasher type fish sonar in the present invention, 10 designates a flasher display, 11 a transmitting-receiving circuit, 12 a control circuit, 13 a transmitting circuit, 14 an ultrasonic vibrator, 15 a receiving circuit, 16 an analogue to digital converter, 17 a first direct current electric power source, R1 a first resistor, R2 a second resistor, R3 a third resistor, R4 a fourth resistor, Tr1 a first transistor, and 18 a second direct current electric power source, and these constitutions are the same as those in the above embodiment and the explanation of these constitutions is omitted. In the embodiment, the luminous body is constituted by four red color luminous diodes 5a, 5b, 5c and 5d. Since the red color luminous diodes 5a, 5b, 5c and 5d have small forward voltages, the two luminous diodes 5a and 5b and 5c and 5d are respectively connected in series and these two series resistor circuits are connected in parallel.

The change of the luminosity of the luminous diodes 5a, 5b, 5c and 5d due to the change of the contact resistance of the slip rings 7 and the brushes 8 is eliminated by the above embodiment.

Figure 6:
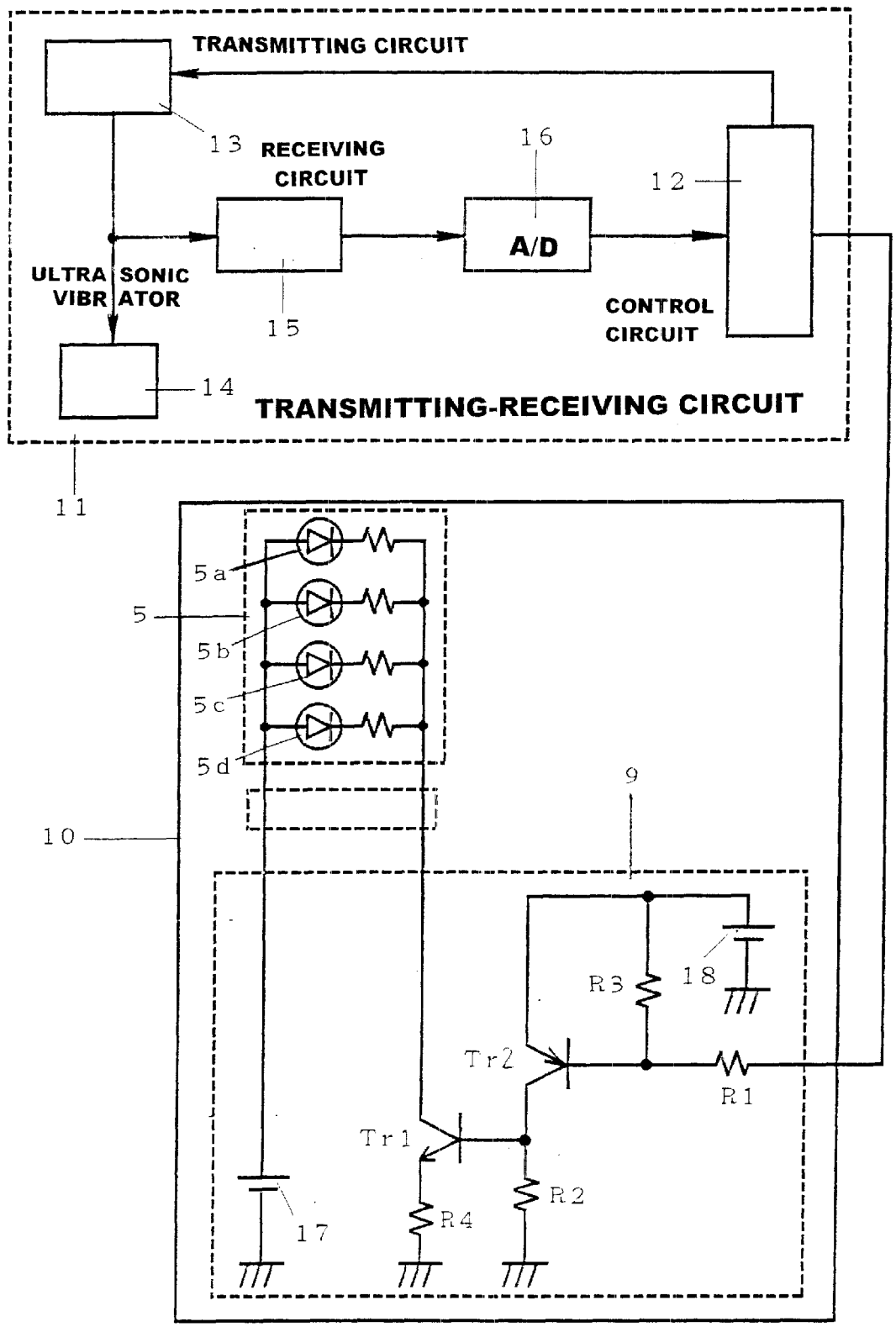
FIG. 6 shows a block diagram of the flasher type fish sonar of another embodiment in the present invention.

FIG. 6 shows another embodiment of the flasher type fish sonar in the present invention, 10 designates a flasher display, 11 a transmitting-receiving circuit, 12 a control circuit, 13 a transmitting circuit, 14 an ultrasonic vibrator, 15 a receiving circuit, 16 an analogue to digital converter, 17 a first direct current electric power source, R1 a first resistor, R2 a second resistor, R3 a third resistor, Tr1 a first transistor, Tr2 a second transistor, and 18 a second direct current electric power source, and these constitutions are the same as those in the above embodiment and the explanation of these constitutions is omitted. In the embodiment, the luminous body 5 is constituted by four green color luminous diodes 5a, 5b, 5c and 5d. Since the green color luminous diodes 5a, 5b, 5c and 5d have large forward voltages, the four luminous diodes 5a, 5b, 5c and 5d are connected in parallel.

The change of the luminosity of the luminous diodes 5a, 5b, 5c and 5d due to the change of the contact resistance of the slip rings 7 and the brushes 8 is eliminated by the above embodiment.

Figure 7:
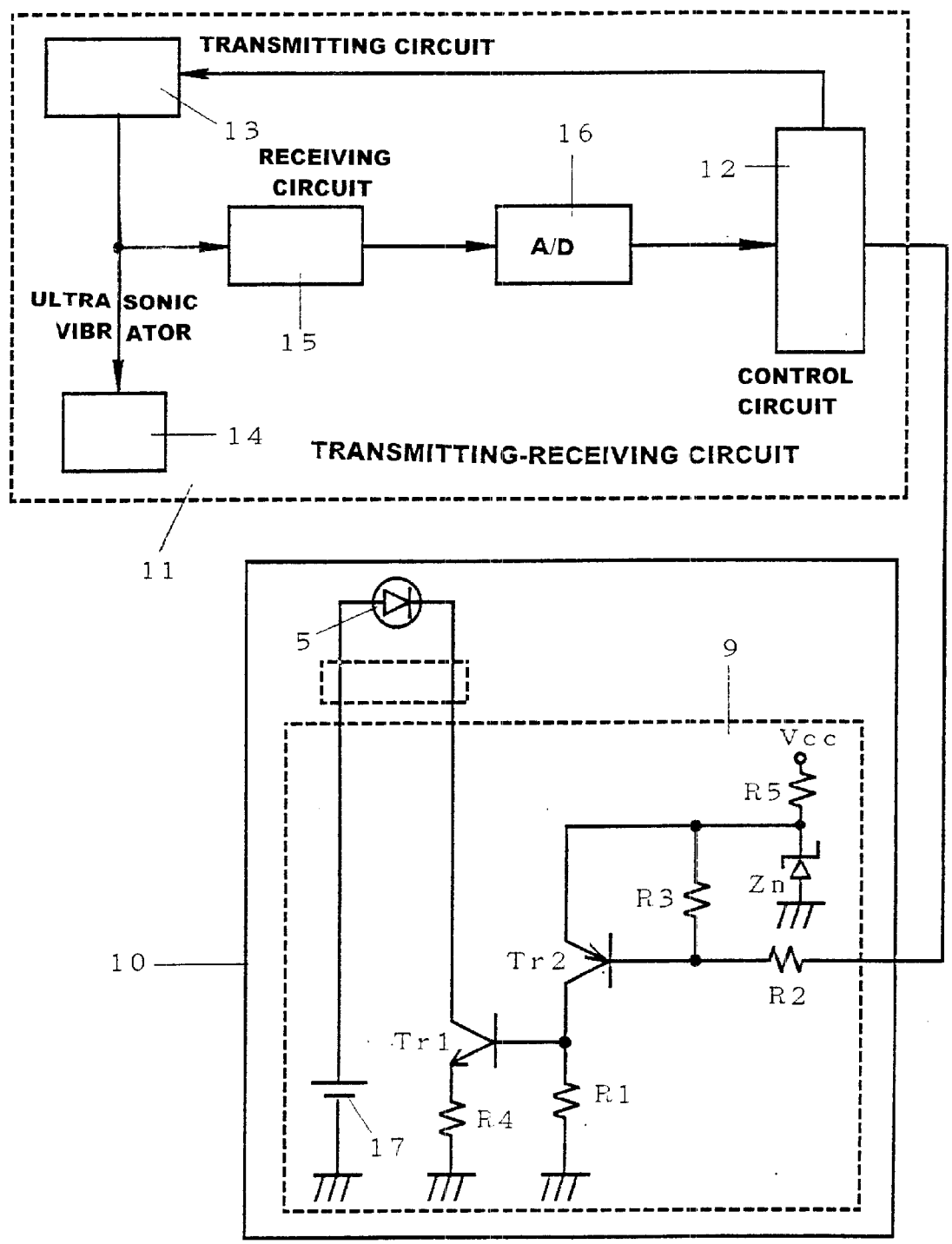
FIG. 7 shows a flasher display in another embodiment of the present invention.

FIG. 7 shows another embodiment of the flasher type fish sonar in the present invention, 10 designates a flasher display, 11 a transmitting-receiving circuit, 12 a control circuit, 13 a transmitting circuit, 14 an ultrasonic vibrator, 15 a receiving circuit, 16 an analogue to digital converter, 17 a first direct current electric power source, R1 a first resistor, R2 a second resistor, R3 a third resistor, Tr1 a first transistor, and Tr2 a second transistor, and these constitutions are the same as those in the prior art and the explanation of these constitutions is omitted. In the embodiment, a zener diode Zn is connected instead of the second direct current electric power source 18.

In this embodiment, the zener diode Zn acts the same as the second direct current electric power source 18.

In the above embodiments, though the first and second transistors Tr1 and Tr2 are used as a constant electric current circuit, another constant electric current circuit may by used.

As stated above, in the flasher type fish sonar of the present invention, because a constant electric current from the second direct current electric power source flows between the emitter and collector of the second transistor, whereby a constant voltage is generated by the fourth resistor connected to the emitter of the first transistor, therefore, a constant electric current from the first direct current electric power source is flowed between the collector and emitter of the first transistor, the change of the electric current due to the change of the contact resistance of the slip rings and brushes is omitted, even if the contact resistance in the slip rings and brushes is changed, the constant electric current flows in the luminous body, and the luminosity of the luminous body is not changed.

What is claimed is:

1. A flasher type fish sonar comprising: an ultrasonic vibrator for transmitting ultrasonic waves in water and for receiving reflected signals in the water, a transmitting circuit for supplying oscillating signals to the ultrasonic vibrator, a receiving circuit for amplifying reflected signals received by the ultrasonic vibrator, an analogue to digital converter for converting the reflected signals to digital signals, an input circuit for inputting the digital signals from the analogue to digital converter through a control circuit, a flasher display including: a rotary disk having a luminous body mounted on the rotary disk and rotated by a motor, and a display board having a window displaying luminosity of the luminous body by inputting the digital signals from the input circuit through brushes connected to the input circuit and slip rings mounted on a rotary shaft of the rotary disk, the slip rings being contacted with the brushes, and a constant current circuit in the input circuit such that a change of electric current flowing to the luminous body due to contact resistance between the slip rings and the brushes is eliminated by the constant electric current from the constant current circuit.

2. A flasher type fish sonar as set forth in claim 1 wherein in the input circuit, the luminous body is connected through the brushes and the slip rings to a first direct current electric power source, a collector of a first transistor is connected through the brushes and the slip rings to the luminous body, a collector of a second transistor is connected to a base of the first transistor, and an emitter of the second transistor is connected to a second direct current electric power source, and reverse signals of digital signals from the analogue to digital converter is supplied to a base of the second transistor, whereby the constant electric current is always supplied from the first direct current electric power source to the luminous body even if the contact resistance between the brushes and the slip rings is changed.

3. A flasher type fish sonar as set forth in claim 2 wherein the second direct current electric power source includes a zener diode.

4. A flasher type fish sonar as set forth in claim 1 wherein the luminous body includes four red color luminous diodes, and two series circuits of two series connected red color luminous diodes each are connected in parallel.

5. A flasher type fish sonar as set forth in claim 1 wherein the luminous body includes four green color luminous diodes connected in parallel.

* * * * *